J. B. KNUDSEN.
UNIVERSAL PIPE JOINT.
APPLICATION FILED MAY 29, 1917.
1,326,939.
Patented Jan. 6, 1920.
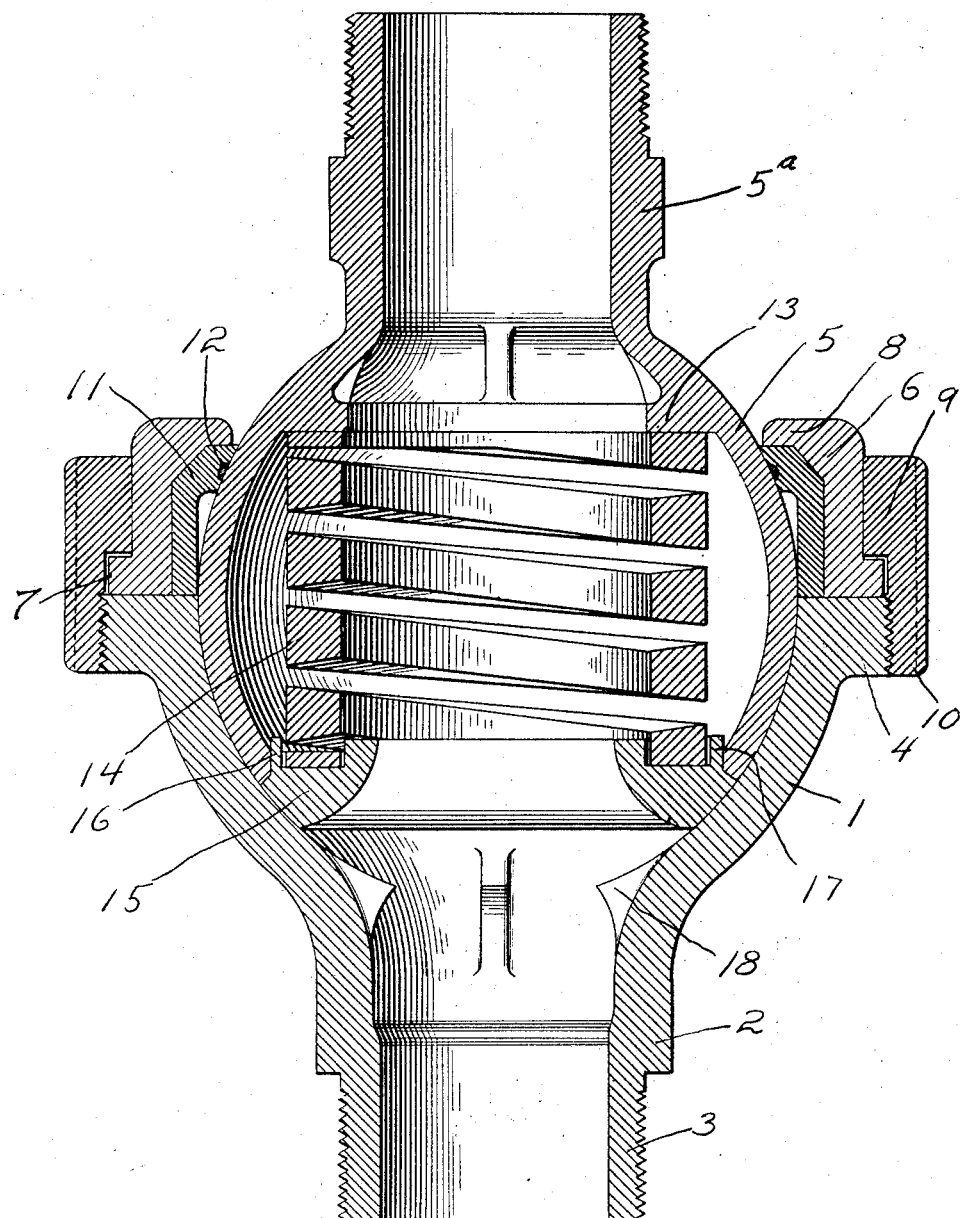
Witness.
Chas. R. Koursh.
Inventor.
Jacob B Knudsen
By: Jones, Addington, Ames & Seibold
Attys.

UNITED STATES PATENT OFFICE.

JACOB B. KNUDSEN, OF CHICAGO, ILLINOIS.

UNIVERSAL PIPE-JOINT.

1,326,939.  Specification of Letters Patent.  Patented Jan. 6, 1920.

Application filed May 29, 1917. Serial No. 171,620.

*To all whom it may concern:*

Be it known that I, JACOB B. KNUDSEN, a citizen of the United States, residing at Chicago, in the county of Cook and State of Illinois, have invented new and useful Improvements in Universal Pipe-Joints, of which the following is a full, clear, concise, and exact description, reference being had to the accompanying drawing, forming a part of this specification.

My invention relates to improvements in pipe joints, and has for its particular object to provide a ball-and-socket coupling, which coupling will always remain water- and steam-tight under varying conditions of service and which will permit of the maximum relative movement of the two sections of the pipe.

For the purpose of disclosing my invention, I have illustrated in the accompanying drawings one embodiment thereof. In said drawings—

The figure is a longitudinal sectional view of a pipe joint embodying my invention.

In the joint illustrated in the drawings, I provide an outer or socket member 1, which is hemispherical in shape and is an extension of the pipe section 2, which pipe section is provided with a threaded end 3 for securing the same to the steam or other pipe. The end of the socket member 1 is provided with an outwardly extending flange 4, screw-threaded for a purpose more fully hereinafter described. Fitting within this socket member is a hollow ball member 5, which likewise has an extension 5ª screw-threaded on its end for connection with a pipe. The ball member is held in position by a retaining ring 6 having an outwardly extending flange 7 and an inwardly extending flange 8. The flange 7 fits under a shoulder 9 formed on a clamping ring 10, which ring is screwed to the shoulder 4 to thereby hold the retaining ring 6 in position. Fitting between the retaining ring 8 and the ball is an annular friction-reducing ring 11, which makes a tight joint against the ball member and is provided, if desired, with a recess 12 filled with graphite or some other suitable material. The interior of the ball member 5 is provided at its neck with an annular inwardly-extending flange 13, which forms a seat for one end of a coil spring 14. The opposite seat for this coil spring comprises a ring 15, which is outside of the ball member and rests on the inner surface of the socket member. This ring, however, is provided with a projection 16 which fits in the open end of the ball member, so that while the ring is mounted to permit a relative movement between the ball member and the ring, the ring, when the ball member is swung in different directions, will move with the ball member. This ring is provided with an annular recess 17, in which the lower end of the spring 14 fits.

The operation of the device is obvious. The coil spring 14 tends to separate the ball member from the ring 15 and to force the ball member into close engagement with the bearing ring 12, so that a tight joint is made at this point at all times. Due to the fact that the ring 15 projects into the open mouth of the ball member, it will move with the ball member when it is swung to its various positions, and at the same time a relative separating movement is permitted between the ball member and the ring, so that the ball member will be held in close engagement with the ring 12 irrespective of the wearing away of this ring.

The throat of the ball member is provided at regular intervals with inwardly extending lugs 18, which provide a support for the ring 15 when the ball member is swung to the furthermost limits of its movement, and I prefer, when the joint is used for steam pipes, to use a cast metal coil spring 14, so that the spring will always retain its temper irrespective of the heat to which it is subjected and the parts will be maintained steam-tight.

Having thus described my invention, what I claim as new and desire to secure by Letters Patent, is:—

In a ball-and-socket pipe coupling, the combination with a hemispherical socket member, of a retaining ring, a ball member fitting said socket member and ring interiorly and held movably against withdrawal by said ring, an abutment ring mounted within said socket member and having an edge-engaging seat for the open end of said ball member, and a coil spring within said ball interposed between said abutment ring and ball member.

In witness whereof, I have hereunto subscribed my name.

JACOB B. KNUDSEN.